US006482283B2

(12) United States Patent
Gorski

(10) Patent No.: US 6,482,283 B2
(45) Date of Patent: Nov. 19, 2002

(54) METHOD FOR MAKING CORNER PROTECTORS

(76) Inventor: Torry L. Gorski, 2096 Timberlane, Wheaton, IL (US) 60187

(*) Notice: Subject to any disclaimer, the term of this patent is extended or adjusted under 35 U.S.C. 154(b) by 57 days.

(21) Appl. No.: 09/799,182

(22) Filed: Mar. 5, 2001

(65) Prior Publication Data

US 2001/0025685 A1 Oct. 4, 2001

Related U.S. Application Data

(63) Continuation of application No. 09/435,519, filed on Nov. 8, 1999, now Pat. No. 6,224,955.

(51) Int. Cl.[7] ................................................ B32B 31/00

(52) U.S. Cl. ....................... 156/196; 156/216; 156/226; 156/256; 156/289; 281/20; 281/42

(58) Field of Search ..................... 281/20, 42; 116/234, 116/238, 239; 156/216, 196, 226, 221, 256, 289

(56) References Cited

U.S. PATENT DOCUMENTS 3,725,170 A * 4/1973 Doll ........................... 156/217
3,900,156 A * 8/1975 Clark, Jr. .................... 206/586
5,626,366 A * 5/1997 Lee ............................ 281/20

OTHER PUBLICATIONS

*Light Impressions The Leading Resource For Archival Supplies* , Mar. 1998, pp. 20–21.

Pioneer Photo Albums, Style No. PCR–1, vinyl corners (Transparent/Pressure Sensitive Photo Mounts)—copies of front and back of container and four samples of actual mounts.

Light Impressions Mounting Corners, copies of front and back of container and two samples of actual mounting corners.

* cited by examiner

*Primary Examiner*—Jeff H. Aftergut
(74) *Attorney, Agent, or Firm*—McAndrews, Held & Malloy, Ltd.

(57) ABSTRACT

The methods and devices of the present invention comprise and result generally in sturdy foldable, performed protective comers of sturdy construction, preferably acid-free, non-yellowing polymeric film, and preferably having a preformed comer pocket for a convenient, snug fit on a comer, and include a self-sticking adhesive for permanent adhesion to a comer. The methods provide convenient steps to creating such products economically.

6 Claims, 6 Drawing Sheets

METHOD FOR MAKING CORNER PROTECTORS

CROSS-REFERNCE TO RELATED APPLICATIONS

This application is a continuation of U.S. patent application Ser. No. 09/435,519, filed Nov. 8, 1999, entitled "CORNER PROTECTORS AND METHOD FOR MAKING SAME" now U.S. Pat. No. 6,224,955.

BACKGROUND OF THE INVENTION

The present invention relates generally to protective comers and, more particularly, to protective comers to adhere to a comer of a book, poster, prospectus, folder, posted notice, or any document or thing prone to wear and tear or mutilation through normal use.

Books and paper documents, and virtually countless other paper and other products, have corners which can become worn, mutilated, unraveled, torn or otherwise destroyed through normal use. Similarly, tacking, taping and other mounting methods can damage the comers of documents. Such untimely destruction can unnecessarily shorten the useful life of the document, book, etc. Unfortunately, no known device existed prior to the present invention which provided an inexpensive, easily mountable, non-yellowing protection device which provides continuing protection to comers. Often, paperback books and novels, or other documents which are read and used repeatedly over long periods of time, had to be replaced or simply discarded. The present invention provides an inexpensive, convenient device which protects and/or repairs the corners of a book or document, for example, to greatly increase the useable life of the book or document. The present invention further provides methods for inexpensively and efficiently mass-producing the corner protectors.

The only known devices which utilize a structure and an adhesive capable of bonding to a comer are (1) Mounting Comers manufactured by Light Impressions of Rochester, N.Y. shown graphically at FIG. 19*a*, and (2) Vinyl Comers made by Pioneer Photo Albums, Inc., of Chatsworth, Calif., shown graphically at FIG. 19*b*. Neither of these products teaches the inventions described herein. The Light Impressions product consists of a strip of plastic material with adhesive on the outer edges thereof. The Light Impressions product does not form a discreet comer pocket as does each embodiment of Applicant's invention. The Pioneer Photo product appears to be a vinyl product with a performed comer, but with adhesive on a backside thereof. It is intended to mount pictures. It cannot protect a comer because of the way the adhesive is preformed and because they are no flaps or other means to allow it to adhere properly to a comer.

SUMMARY OF THE INVENTION

The present invention provides protection devices and methods for corner protectors in many forms. A preferred embodiment of the present invention comprises a relatively firm strip or band of polymeric material which has been preformed having a comer pocket into which a comer to be protected can be inserted, and an adhesive area to adhere the strip to the book or other document or product to be protected, reinforced or repaired. The strip preferably has a flap extending from a fold line about which the flap may be folded so that the flap can adhere to the book or document and provide further support and protection to the document or book. The flap portion of the strip and the adhesive can be positioned such that the flap adheres to either the front or back side of the book, or document. In certain instances, the protective comer has an area of view, which may include an advertisement, notice, logo, company name, security code, bar code, inventory, file number or any other useful information. Further, the protective comers of the present invention can be constructed of translucent or opaque colored material so that files, documents, etc., can be readily organized and retrieved by color coordination.

The present invention also provides methods to efficiently produce the devices of the present invention in mass quantities.

DESCRIPTION OF THE PREFERRED EMBODIMENT

Figure 1:
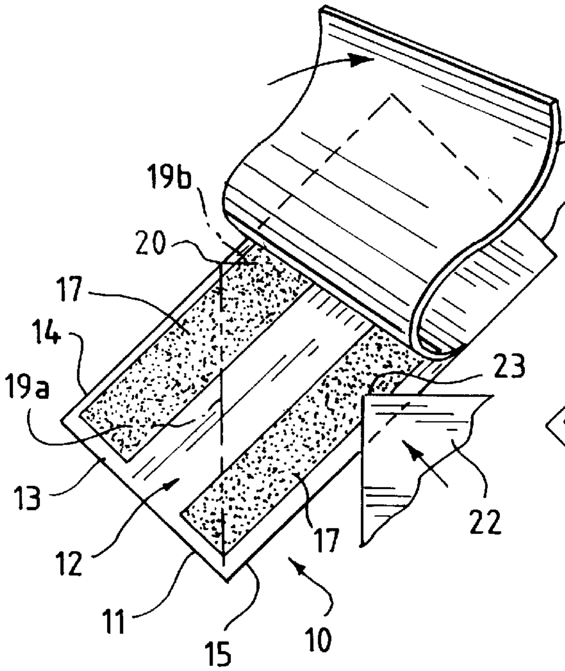
FIGS. 1 through 4 are different views of preferred embodiment one of the device of the present invention.
Figure 2:
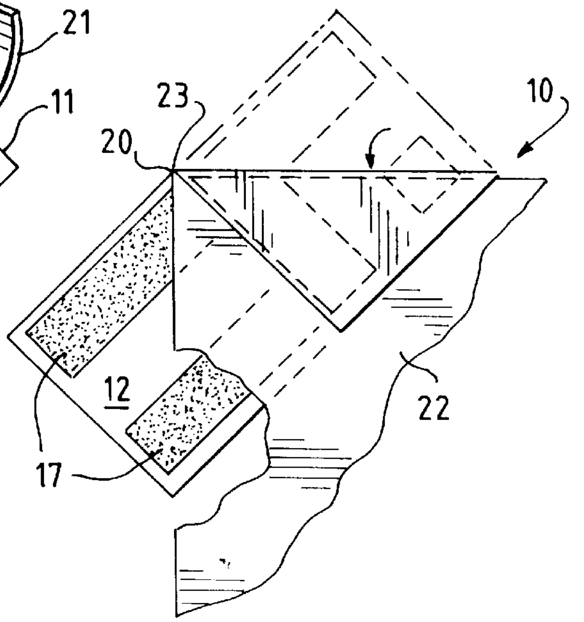
Figure 3:
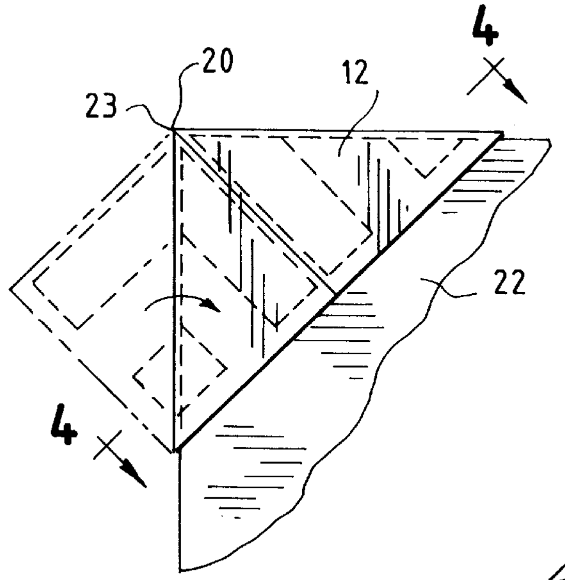
Figure 4:
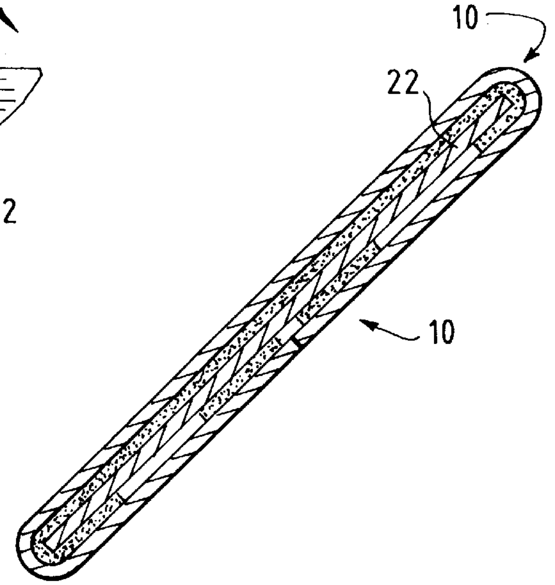
Figure 5:
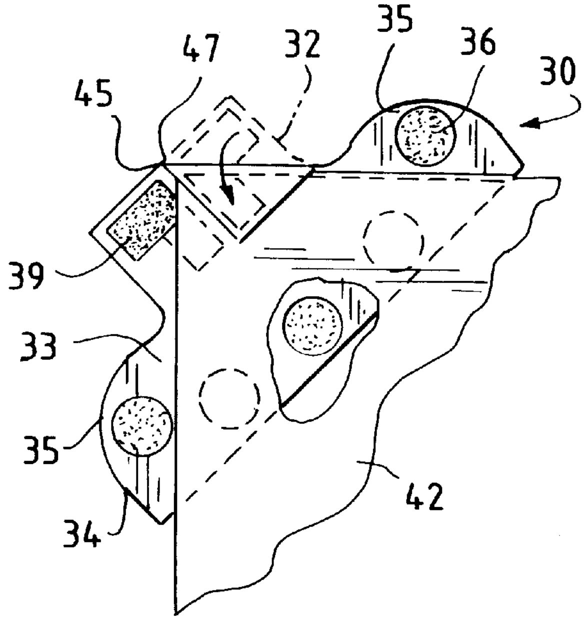
FIGS. 5 through 8 are different views of preferred embodiment two of the device of the present invention.
Figure 6:
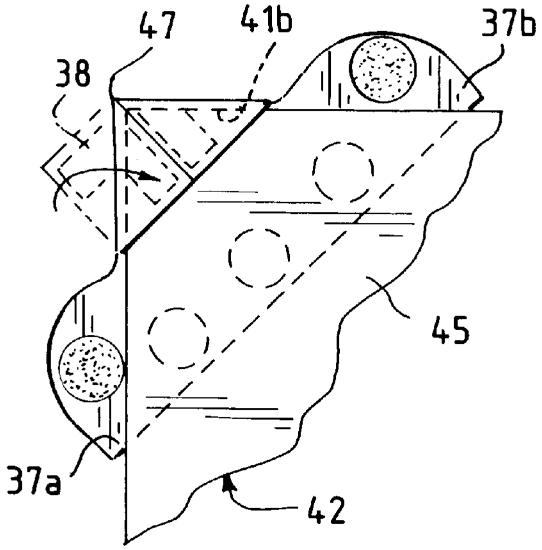

The preferred embodiment of the present invention takes on many forms, as shown in the attached drawing FIGS. 1 through 18. Each will be described herein. Throughout this patent, reference is made to application of the present invention to books or other documents. It should be understood, however, that the invention is at least equally applicable to any other thing which requires comer reinforcement, repair, or protection, such as album covers, disk jackets, posters, prospectuses, folders, posted notices, memos, etc. Further, the size and thickness of each embodiment can vary significantly, depending on the intended application. Additionally, in each embodiment, the exposed surface of the protector, when applied, can carry an advertisement, company name, logo, design, or any other information, as desired.

Preferred Embodiment 1

The first preferred embodiment of the present invention is designated generally 10 in FIGS. 1 through 4. This embodiment includes a substantially rectangular band 12 of firm material having an operational surface 13, a top edge 14, bottom edge 15, and opposing edges 11. Two separate strips of adhesive 17 extend from each edge 11 substantially across band 12. An adhesive cover 21 of the same size as band 12 is removably attached to adhesive stripe 17 for removal upon application of band 12. Band 12 also has two seams 19*a*, 19*b* each extending from top 14 to bottom 15 at bond 12 at 90° with respect to one another.

Corner protector 10 is used by aligning the apex 20 of seams 19*a*, 19*b* at the apex of a corner 22 of a book or other document. Adhesive cover 21 is removed. Band 12 is then adhered to the corner 22 such that the corner apex 23 aligns with seam apex 20. Then, the areas of band 12 distal of seams 19*a*, 19*b* are folded about seams 19*a*, 19*b* such that the adhesive strip portions adhere to the corner 22. Comer 22 is the therefore protected against mutilation and premature wearing. Band 12 is formed of acid-free polypropylene or other firm polymeric material which is clear, resilient and non-yellowing Of course, as with each embodiment of the present invention, band 12 may be formed of any sturdy, firm material resistant to mutilation from normal use.

Preferred Embodiment 2

This preferred embodiment is designated generally 30 in FIGS. 5 through 8. This embodiment includes a band 32 in the shape as shown being symmetrical about a centerline and being shoe-shaped on each side thereof. An upper section 32 is generally rectangular and a lower section 34 is generally rectangular with rounded corners 35 on the upper sides thereof, as shown. Band 32 has an operational surface 33 which abuts the book page 42 surface to be protected. A plurality of adhesive areas 36 are preferred on surface 33 for contact with and adhesion to page 42. Each area 36 has an adhesive cover 38 which can be readily peeled away to expose the adhesive. Upper section 32 also has adhesive areas 38. Adhesive areas 38 are preferably T-shaped and comprise one continuous area or two L-shaped areas back-to-back, as shown. Areas 38 also have a corresponding cover 39 which may be readily peeled away to expose the adhesive surfaces. Band 33 has two seams 41*a*, 41*b* running from a center point at the tope of upper section 32 to approximately the lower corners 37*a*, 37*b of lower section 34 in* 90° relation to one another, such that outer portions of band 32 may easily fold along seams 41*a*, 41*b*.

Figure 7:
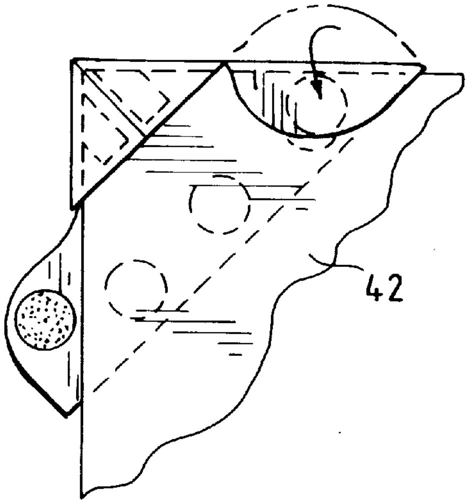
Figure 8:
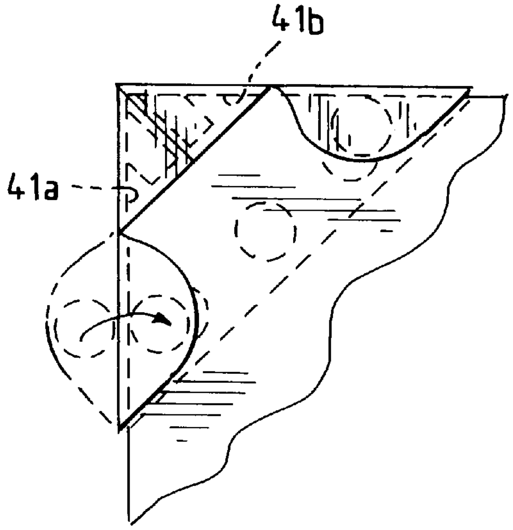

Embodiment 2 of corner protector invention 30 is used as follows. The corner 45 of a document 42 sought to be protected is placed in loose alignment with apex 47 and seams 41*a*, 41*b*. At that time, adhesive covers 38 are removed from areas 36 and lower section 34 of band 32 is adhered to document 42. Then, cover 39 may be removed to expose adhesive area 38. At that time, both upper section 32 and lower section 34 outer portions can be folded about seams 41*a*, 41*b*, as seen in FIGS. 7 and 8, to adhere to and stabilize cover 45 of document 42. This embodiment covers a relatively small area of the protected corner, in those situations where that may be necessary or important.

Preferred Embodiment 3

This preferred embodiment is designated generally 50 in FIGS. 9 through 12. This embodiment 50 consists generally of a lower rectangular portion 51 and upper triangular portion 52, with the apex of the upper portion 52 removed, as seen best in FIG. 9. Lower portion 51 has an adhesive strip 53 across substantially all of that area, and having a peelable protection strip 54 thereon.

Figure 9:
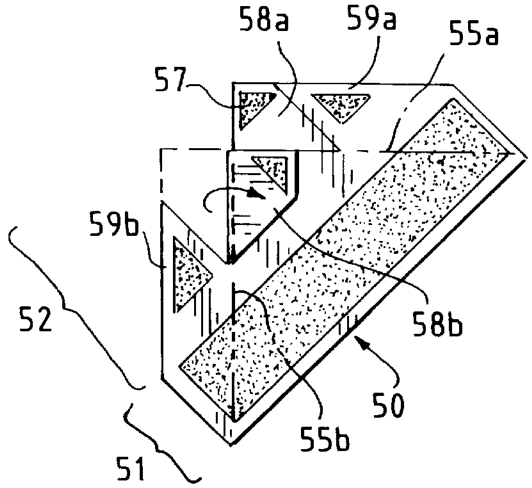
FIGS. 9 through 12 are different views of preferred embodiment three of the device of the present invention.
Figure 10:
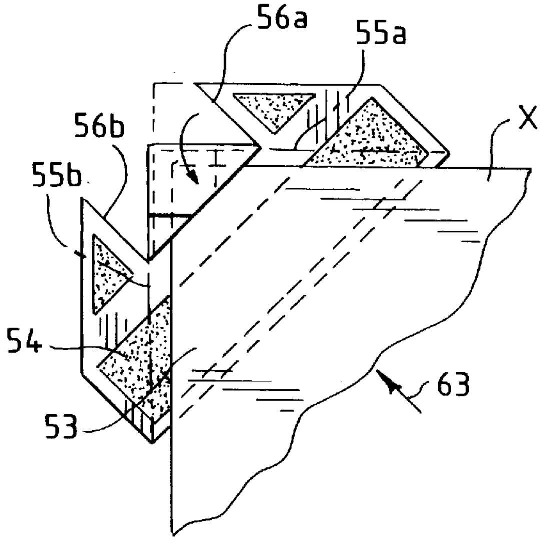

Embodiment 50 includes the following features. Two fold lines or seams 55*a*, 55*b* run from the lower corners of lower portion 51 to the corner of the cutout section of upper portion 52, and are situated in 90° relation to one another, as shown in FIG. 9. Two slits 56*a*, 56*b* exist in upper portion 52, as seen in FIG. 10, resulting in four flaps 58*a*, 58*b* and 59*a*, 59*b*. Each flap 58*a*, 58*b*, 59*a*, 59*b* includes an adhesive section on an operational surface thereof having a protective peelable cover attached thereto. The operational surface is the surface which will contact the corner to be protected.

Figure 11:
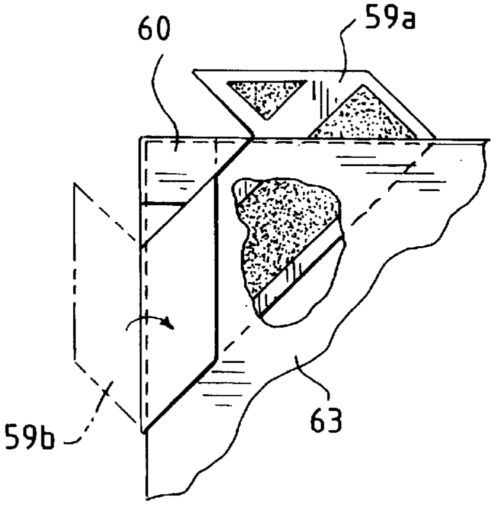
Figure 12:
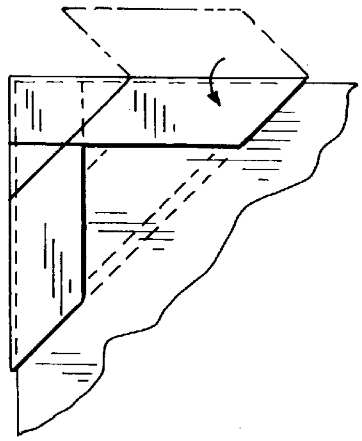

As best seen with reference to FIGS. 10 through 12, embodiment 50 is used in the following manner. Flap 58*b* is folded along seam 55*b*. Flap 58*a* is then folded along seam 55*a* such that the adhesive on flap 58*a* adheres to the back side of flap 58*b*, thus forming a corner pocket 60. Once formed, the corner of document 63 is inserted into pocket 60 until properly aligned. Once properly aligned, the adhesive strips on flaps 59*a*, 59*b* are exposed and the flaps are folded to adhere to document 63, as best seen in FIGS. 10 and 11. The adhesive of lower rectangular portion 51 may also be exposed to adhere to document 63. The adhesive may be continuous or discreet smaller portions.

This embodiment is especially preferred due to its ease of manufacture. This embodiment allows the protector to be easily mass-produced in a single run. Because of the overlap of flaps 58*a* over 58*b*, the protector can be manufactured with a pre-formed corner very readily. To do so, a suitably sized strip 50 is cut or delineated from a larger source of suitable material. The strip is formed with the seams 55*a*, 55*b*. The adhesive strips are adhered. Importantly, an adhesive 57 is placed on the operational side of flap 58*a*. No adhesive protective cover is placed on adhesive patch 57. Instead, when ready, flap 58*b* is folded along seam 55*b* and then flap 58*a* is folded along seam 55*a*. Adhesive 57 then adheres to the back side of flap 58*b* to create a pre-formed corner for perfect alignment with a corner. With such a product design and system, it is believed the product can be readily mass-produced with very little if any human involvement in forming the pre-formed corner, making production of the product very economical.

Preferred Embodiment 4

Figure 13:
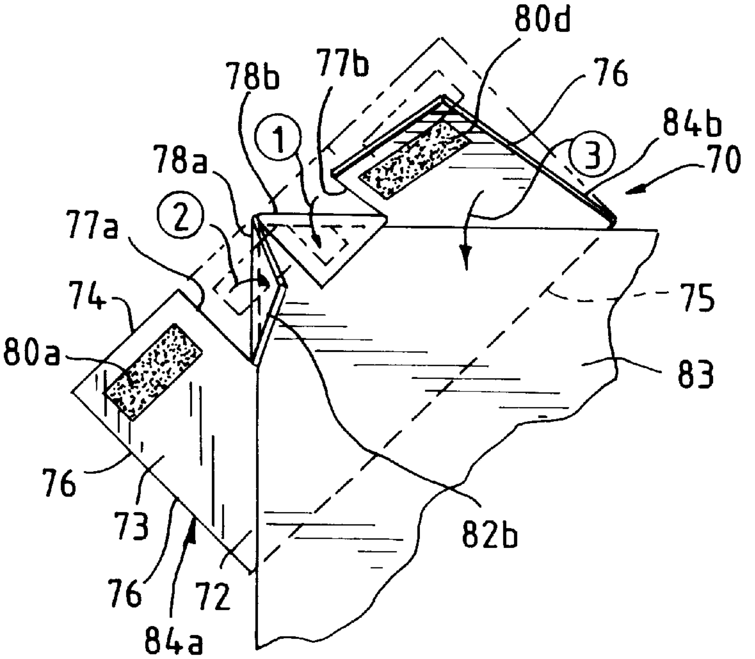
FIGS. 13 and 14 are different views of preferred embodiment four of the device of the present invention.
Figure 14:
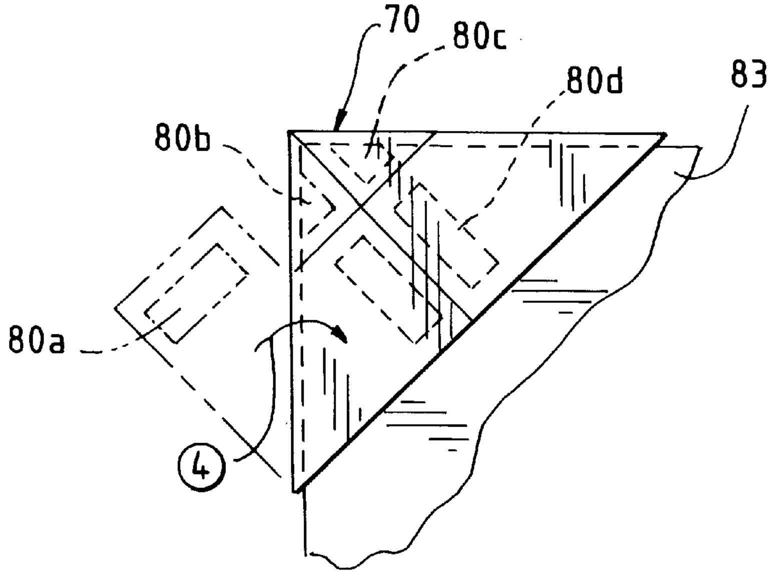

This preferred embodiment is designated generally 70 in FIGS. 13 and 14. Embodiment 4 of corner protector 70 comprises a generally rectangular strip 72 of firm, preferably polymeric, material which is acid-free and non-yellowing. Strip 72 has an operational surface 73, top 74, bottom 75 and opposing edges 76. Extending a predetermined distance downward toward bottom 75 from top 74 are slits 77*a*, 77*b* spaced equidistantly from the center of top 74. Protector 70 further includes seams 78*a*, 78*b* preformed into surface 73, and extending from the center of top 74 to the corners of bottom 75 and in 90° relation to one another. Adhesive strips 80*a*, 80*b*, 80*c*, 80*d* are located across the upper portion of operational surface 73 as shown.

In use, protector 70 is placed in position so that a corner 87 of a document is substantially aligned with the center of top 74 of protector 70 and seams 78*a*, 78*b*. First triangular flap 82*a* is folded over so that it adheres to a surface of corner 87. Next, triangular flap 82*b* is folded over to adhere to the surface or corner 87. Then, flaps 84*a*, 84*b* are folded over along seams 78*a*, 78*b* to adhere to, stabilize and protect corner 87, as seen in FIGS. 13 and 14.

Preferred Embodiment 5

Figure 15:
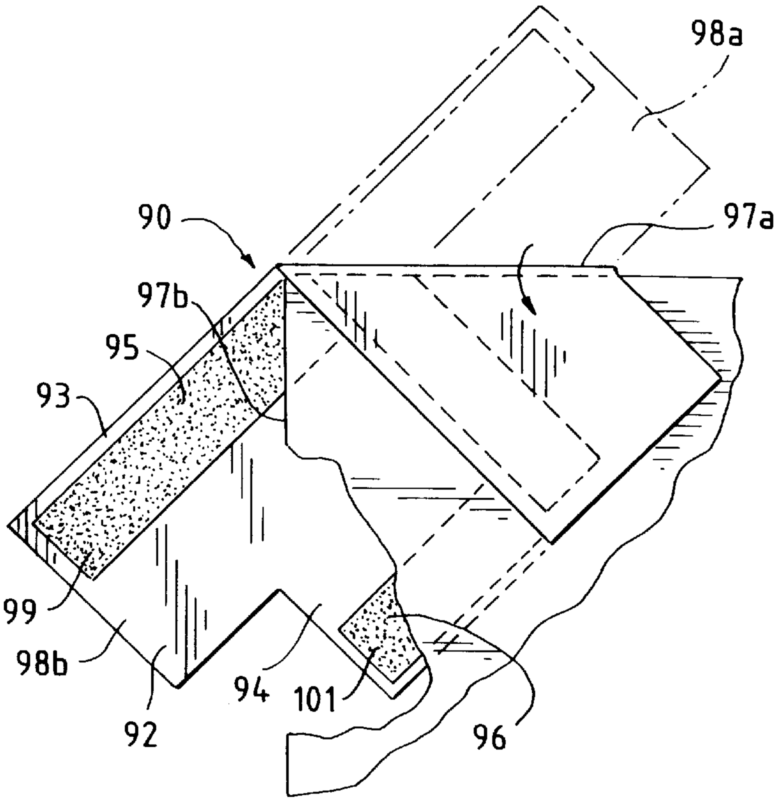
FIGS. 15 and 16 are different views of preferred embodiment five of the device of the present invention.
Figure 16:
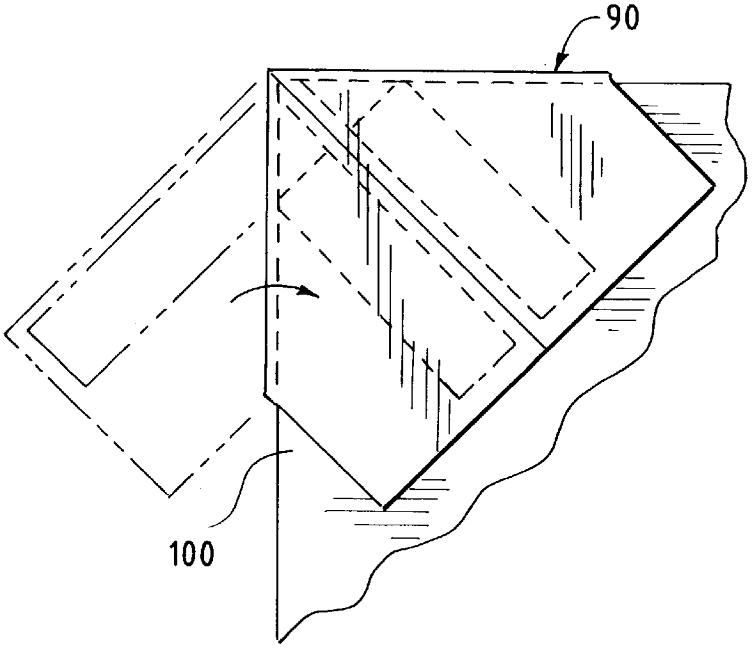

The Preferred Embodiment 5 is designated generally 90 in FIGS. 15 and 16. Embodiment 5 of corner protector 90 comprises a generally T-shaped band of material 92. Band 92 has top horizontal portion 93 and bottom vertical portion 94, depending therefrom. At approximately the lower-most portion of bottom portion 94, is an adhesive strip 96. Adhesive strip 96 can be an elongated strip, as shown, on one or more discreet adhesive pieces. The inclusion of bottom portion 94, and adhesive strip 96 thereon, provides for increased durability and stability to the protective corner when mounted to its target. Protector 90 also includes preformed seams 97*a*, 97*b*. Seams 97*a*, 97*b* extend downwardly from the center of the top edge of top portion 93, in 90° relation to one another. Top portion 93 also includes adhesive strip 99 across the very top section thereof.

In use, protector 90 is positioned to be adhered to a corner as follows. Top portion 93 is folded along seams 97*a*, 97*b* so that a corner is formed. At this point, adhesive protector 95 of adhesive strip 99 is still in place. The corner formed of protector 90 is fitted over the corner 100 to be protected. Then, the lower adhesive protector 101 is removed and lower portion 94 is adhered to the book or corner 100 to be protected. Flaps 98*a*, 98*b* defmed by seams 97*a*, 97*b* are then folded back along seams 97*a*, 97*b* and adhesive protective corner 95 is removed. Lastly, flaps 98*a*, 98*b* are folded over to adhere to book or corner 100, securing protector 90 in place to protect the book or corner 100, as best seen with reference to FIG. 16.

Preferred Embodiment 6

Figure 17:
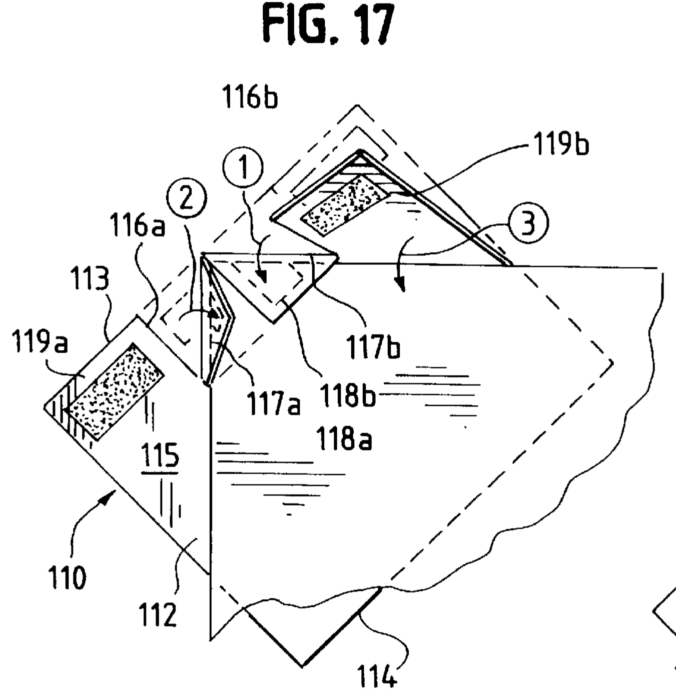
FIGS. 17 and 18 are different views of preferred embodiment six of the device of the present invention.
Figure 19A:
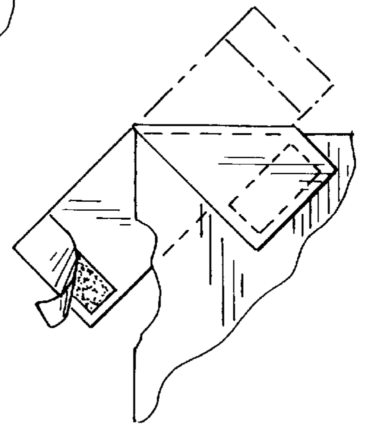
FIG. 19a PRIOR ART
FIGS. 19*a* and 19*b* are representations of devices in the prior art.
Figure 18:
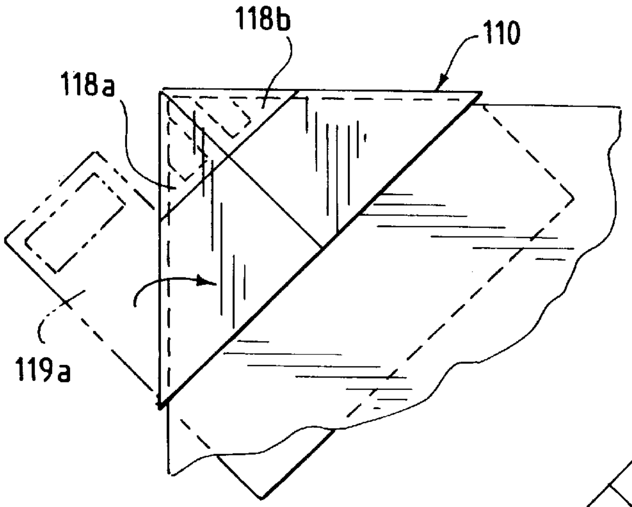
Figure 19B:
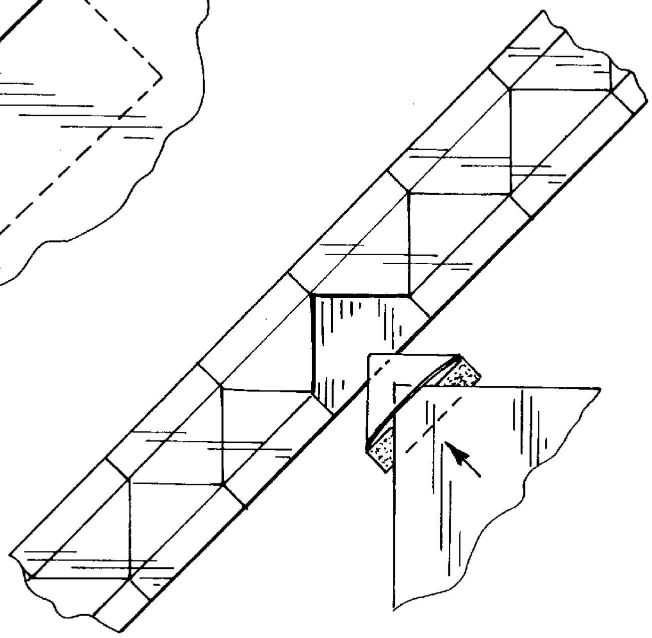
FIG. 19b PRIOR ART

Preferred embodiment 6 is designated generally 110 in FIGS. 17 and 18. Embodiment 6 of protector 110 comprises a generally square band of material 112. Band 112 has a top edge 113, a bottom edge 114, and operational surface 115. Two slits 116*a*, 116*b* depend downwardly from top edge 113 equidistantly from a center of top edge 113, approximately preferably ½inch. Two seams 117*a*, 117*b* are preformed in material 112 depending from the center of top edge 113 to the bottom of slits 116*a*, 116*b,* such that seams 117*a*, 117*b* are at a right angle to one another. Seams 117*a*, 117*b,* and slits 116*a*, 116*b* define flaps 118*a*, 118*b,* and tabs 119*a*, 119*b*. Each of flaps 118*a*, 118*b*, and 119*a* and 119*b* has an adhesive strip thereon with a protective, removable covering.

In use, protector 110 is positioned to be adhered to and protect a corner as follows. Top edge 113 and the apex of seams 117*a*, 117*b,* are placed near the corner. Flaps 118*a*, 118*b* are folded over along seams 117*a*, 117*b*. With one flap 118*a* or 118*b* folded over the adhesive protective covering of the other is removed to expose the adhesive. That flap 118*b* or 118*a*, is then adhered to the corner. Subsequently, the other flap is adhered to the corner in a similar manner. Then, the adhesive strips of tabs 119*a*, 119*b* are removed and folded about seams 118*a*, 118*b* to adhere to and reinforce the corner.

Additional Features Applicable To The Various Embodiments

As stated, several preferred embodiments include a pocket, pre-formed or otherwise, in the shape of a right triangle. On each embodiment, an adhesive may be used to apply the protective corner to the target document. However, in each such embodiment, the protective corner may be constructed so as to allow insertion and temporary holding of another document within the protector when in use.

This feature will be described, for instance, with reference to FIGS. 9–12. In FIGS. 9 and 10, protective corner includes flaps 58*a* and 59*b* which fold over upon one another and form a pocket. The protector may include an adhesive exposed within an interior of the formed pocket to secure the protector to a corner. However, a desirable feature in such an embodiment may be to include an adhesive on only the bottom surface within the pocket. Or the user could simply leave the adhesive cover strip on the adhesive so that it does not expose the adhesive. In either case, this feature would allow easy insertion and the securing of a corner into the pocket, but would also leave a top surface of the corner of the document not adhered to this inside of the pocket. As such, another document, such as a business card, photo, or anything the user may wish to associate with the document, could be temporarily inserted into the pocket and be removably held in the corner protector.

Another feature possibly common to each preferred embodiment is the use of opaque or translucent colored materials to construct the corner protectors. This feature allows the protector to be fabricated in any different color, combination of colors, or design. This feature would allow color-coded filing conveniences and organization while also providing the protection to the documents.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

I claim:

1. A method of forming a corner protector comprising the steps of (a) providing a two-sided strip of sturdy material having a length and width, and having an operational surface and an outer surface, and a top; and a bottom;

(b) forming a corner pocket by (i) making two cuts depending from the top;

(ii) forming two seams from the top toward the bottom such that the seams are at an angle to one another;

(iii) creating two flaps defined by the two cuts, the two seams, and the top;

(iv) folding the flaps along the seams; and (v) securing the flaps together to form a corner pocket; and (c) placing adhesive onto the operational surface to adhere to an object.

2. The method of claim 1, wherein the strip is substantially rectangular.

3. The method of claim 1 wherein the length of the strip is up to approximately 2 inches, and the width is up to approximately 1.5 inches.

4. The method of claim 1 wherein the two cuts depending from the top are made substantially equidistant from a center thereof.

5. The method of claim 1 wherein the seams are substantially at a right angle to one another.

6. The method of claim 1 further comprising (d) placing a removable cover over the adhesive to prevent unintended adhesion.

* * * * *